(12) United States Patent
Landry

(10) Patent No.: US 8,733,691 B2
(45) Date of Patent: May 27, 2014

(54) SPLIT PIVOT FITTING FOR HELICOPTER LANDING GEAR

(75) Inventor: Martin Landry, St. Jerome (CA)

(73) Assignee: Textron Innovations Inc., Providence, RI (US)

( * ) Notice: Subject to any disclaimer, the term of this patent is extended or adjusted under 35 U.S.C. 154(b) by 597 days.

(21) Appl. No.: 12/864,699

(22) PCT Filed: Jan. 16, 2009

(86) PCT No.: PCT/US2009/031303
§ 371 (c)(1),
(2), (4) Date: Jul. 27, 2010

(87) PCT Pub. No.: WO2009/097192
PCT Pub. Date: Aug. 6, 2009

(65) Prior Publication Data
US 2010/0308156 A1    Dec. 9, 2010

Related U.S. Application Data

(60) Provisional application No. 61/023,922, filed on Jun. 21, 2010.

(51) Int. Cl.
*B64C 25/00* (2006.01)
*B64C 27/00* (2006.01)

(52) U.S. Cl.
USPC ........................................................ 244/17.17

(58) Field of Classification Search
USPC ..................... 244/17.17, 108, 100 R, 104 R
See application file for complete search history.

(56) References Cited

U.S. PATENT DOCUMENTS

| 2,393,110 | A | 1/1946 | Kops et al. ................. 244/100 R |
| 3,193,221 | A | 7/1965 | Parshley et al. ........... 244/100 R |
| 3,716,208 | A | 2/1973 | Fagan et al. |
| 4,270,711 | A | 6/1981 | Cresap et al. .............. 244/17.17 |

FOREIGN PATENT DOCUMENTS

CN    1209406    8/1998

OTHER PUBLICATIONS

Extended European Search Report from associated application # 09706631.0/2422. Dated Jul. 10, 2012 and issued from the European Patent Office, 6 pages.
First Office Action from corresponding Chinese Patent Application No. 200980103357.X issued by the Chinese Patent Office issued Dec. 25, 2012, 7 pages.
International Search Report and Written Opinion of the International Searching Authority in Parent Application PCT/US09/31303, mailed on Mar. 16, 2009, 8 pages.
International Preliminary Report on Patentability of the International Preliminary Examining Authority in Parent Application PCT/US09/31303, mailed on Mar. 16, 2012, 4 pages.
European Office Action issued from the European Patent Office in the corresponding application No. 09706631.0-1754 dated Mar. 7, 2013 3 pages.

*Primary Examiner* — Valentina Xavier
(74) *Attorney, Agent, or Firm* — James E. Walton; Damon R. Hickman

(57) ABSTRACT

A multi-piece pivot fitting for use on aircraft with skid type landing gear has a forward fitting, and aft fitting, and at least a lower strap. This configuration allows cross tube loads to be transferred to the keel beams of the aircraft, thereby allowing selected longitudinal rocking of the aircraft and preventing the aircraft from going into a resonance state.

14 Claims, 6 Drawing Sheets

SPLIT PIVOT FITTING FOR HELICOPTER LANDING GEAR

TECHNICAL FIELD

The present invention relates to fittings for aircraft landing gear, in particular, for skid-type aircraft landing gear.

DESCRIPTION OF THE PRIOR ART

In general, helicopters and other similar aircraft include a fuselage having a cabin portion and a tail boom. These aircraft are powered and controlled by engines, propulsion systems, such as rotor systems, and flight control systems. The cabin portions are generally defined by interconnected roof assemblies, side walls, and floor structures. The floor structures often include longitudinal keel beams and transverse cross beams. The exterior of the fuselage is usually covered and defined by windows, doors, fairings, panels, skins, access panels, and other structures.

There are many different types of landing gear for aircraft, including fixed and retractable wheels, skid gears, pontoons, and certain combinations thereof. Skid-type landing gear systems generally have a transverse forward cross tube, a transverse aft cross tube, and generally longitudinal skid members. On some aircraft, the cross tubes and portions of the skid members are fully or partially hidden inside the fuselage. Usually this is done for aerodynamic reasons, such as to reduce drag.

With some helicopters and other similar aircraft, particularly those with more than two main rotor blades, it is necessary to utilize pivot bolts and/or large rocker beams that allow fuselage rocking, so as to prevent the aircraft from going into a resonance state. This is because such multi-bladed aircraft produce certain frequencies, i.e., 4 per rev., which can allow the aircraft to go into a resonance state. For example, it is well known for helicopters with more than two blades and skid-type landing gear, to pivotally pin the aft cross tube at its midpoint to a transverse rocker beam. A rocker beam is large half-tube assembly that spans the width of the fuselage and is attached at its ends to the fuselage. The aft cross tube of the skid gear is pivotally attached to the midpoint of the rocker beam. This system creates a three-point attachment of the landing gear to the aircraft: two attachments at the forward cross tube, and one attachment at the aft cross tube, that simulates a four-point attachment. Rocker beams are heavy, expensive, and create drag. In other attachment systems, the aft cross tube is pivotally coupled to one or more of the transverse cross beams that form the floor structure. These systems allow the cross tube loads to be transferred to the keel beams of the aircraft, thereby allowing selected longitudinal rocking of the aircraft and preventing the aircraft from going into a resonance state.

However, these pivot bolts must be accessible and removable for installation, removal, inspection, servicing, and maintenance. If the pivot bolt is located within the helicopter structure, then one or more access panels in the exterior of the fuselage and one or more access panels in the interior floor structure must be provided. This is undesirable, because access panels add extra weight and complexity in the design of the skins of the aircraft, require additional hardware, and require additional time for inspections.

Although great strides have been made in the area of aircraft landing gear, considerable shortcomings remain.

BRIEF DESCRIPTION OF THE DRAWINGS

The novel features believed characteristic of the invention are set forth in the description. However, the invention itself, as well as, a preferred mode of use, and further objectives and advantages thereof, will best be understood by reference to the following detailed description when read in conjunction with the accompanying drawings, wherein.

Figure 1:
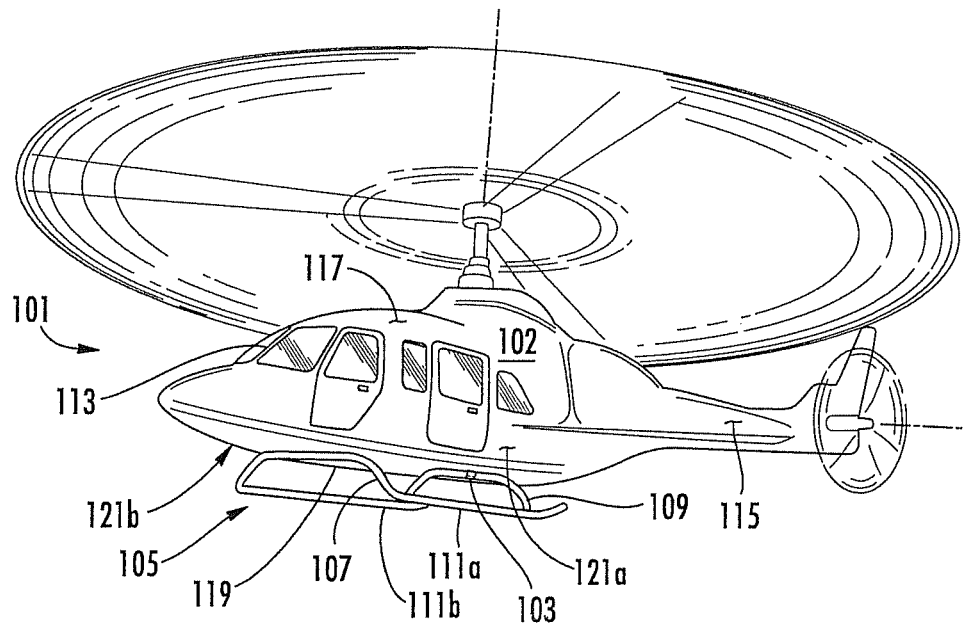
FIG. 1 is a perspective view of an aircraft having a split pivot fitting for landing gear according to the present application.
Figure 2:
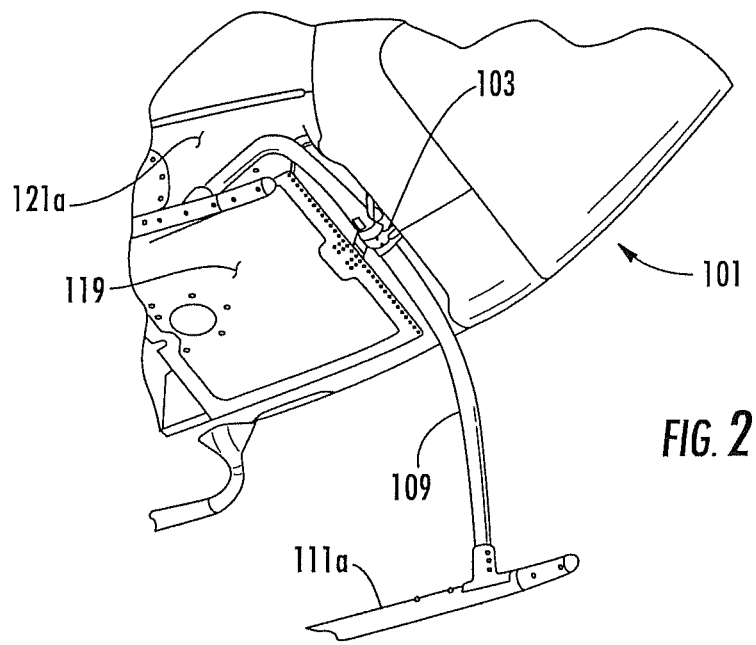
FIG. 2 is a perspective view of the split pivot fitting installed on the rear cross tube of the landing gear of the aircraft of FIG. 1, as seen from underneath the aircraft.
Figure 3:
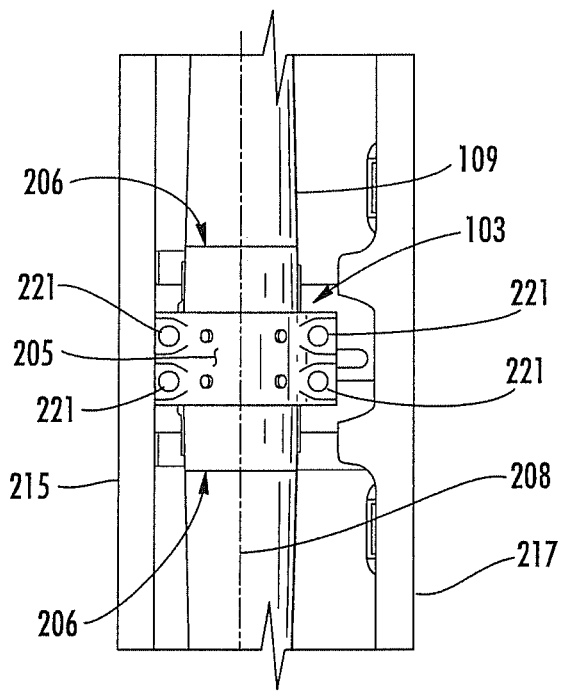
FIG. 3 is a bottom view of the split pivot fitting installed on the rear cross tube of the landing gear of the aircraft of FIG. 1.
Figure 4:
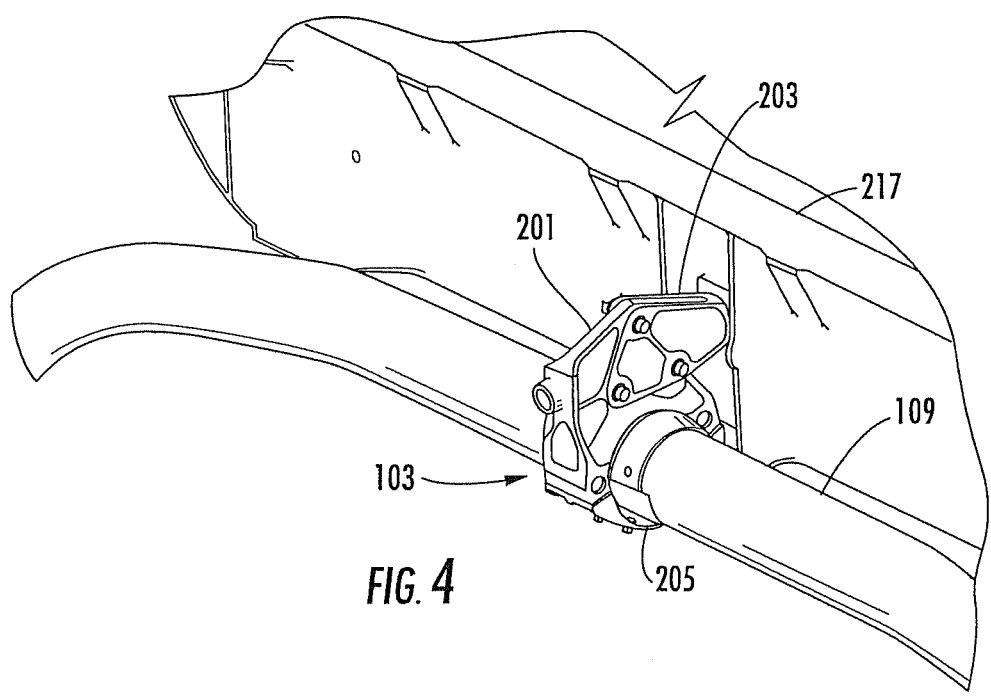
FIG. 4 is a perspective view of the split pivot fitting installed on the rear cross tube of the landing gear of the aircraft of FIG. 1, as seen from inside the aircraft.
Figure 5:
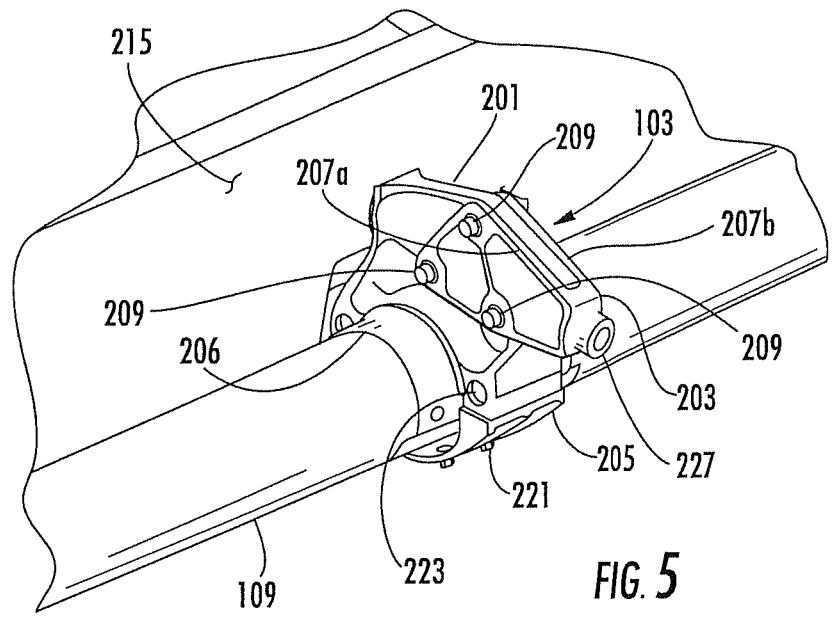
FIG. 5 is a perspective view of the split pivot fitting installed on the rear cross tube of the landing gear of the aircraft of FIG. 1, as seen with the aft cross beam of the aircraft removed.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as described herein.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Referring to FIG. 1 in the drawings, the preferred embodiment of an aircraft 101 having a split pivot fitting 103 for use with a landing gear 105 is illustrated. Split pivot fitting 103 replaces the pivot bolts (not shown) used in the prior art. Although aircraft 101 has been illustrated as a helicopter, it should be understood that aircraft 101 may be any of a wide variety of aircraft, including, helicopters, tiltrotor aircraft, other rotorcraft, and other types of aircraft. Aircraft 101 includes a fuselage 102 having a cabin portion 113 and a tail boom 115. Aircraft 101 is powered and controlled by an engine, a propulsion system, such as a rotor system, and a flight control system. Cabin portion 113 is generally defined by a roof assembly 117, a floor structure 119, and side walls 121a and 121b. Although landing gear 105 has been shown as a skid-type landing gear having a forward cross tube 107, an aft cross tube 109, and generally longitudinal skid members 111a and 111b, it will be appreciated that split pivot fitting 103 may be used with other types of landing gear.

Referring to FIGS. 2-6 in the drawings, split pivot fitting 103 is shown installed onto aft cross tube 109 of aircraft 101. In the preferred embodiment, a single split pivot fitting 103 is used on aft cross tube 109, and is disposed at the lateral midpoint of cross tube 109. However, it will be appreciated that additional split pivot fittings 103 may be used or desired in certain applications.

In the preferred embodiment, split pivot fitting 103 includes a forward fitting 201, an aft fitting 203, a lower strap 205, and a sleeve assembly 206. However, alternative embodiments may not utilize a sleeve assembly 206. Forward fitting 201 includes a lower portion configured to matingly receive at least one of sleeve assembly 206 and an upper portion of cross tube 109. In a similar fashion, lower strap 205 is shaped and configured to matingly receive at least one of sleeve assembly 206 and a lower portion of cross tube 109. Forward fitting 201 and lower strap 205 are releasably fastened together by a fastening means, thereby producing a snug fit between split pivot fitting 103 and cross tube 109. In the preferred embodiment, the fastening means is four bolts 221 and four corresponding rotatable nut plates 223. It will be appreciated that the means for releasably fastening forward fitting 201 to lower strap 205 may be any of a wide variety of releasable, detachable, or adjustable fastening means, including clamps, clips, pins, screws, latches, etc. The words first and forward, as well as the words second and aft, may be used interchangeable in this application. For example, forward fitting 201 is synonymous with a first fitting 201; aft fitting 203 is synonymous with a second fitting 203; a forward pivot pin 225 is synonymous with a first pivot pin 225; and an aft pivot pin 227 is synonymous with a second pivot pin 227.

In the preferred embodiment, sleeve assembly 206 surrounds substantially all of cross tube 109; however, it will be appreciated that in some applications it is not necessary to have a sleeve assembly 206. Also, it may be necessary and/or desirable for sleeve assembly 206 to only partially surround or contact cross tube 109. Sleeve assembly 206 is preferably formed of two or more sections and is secured to cross tube 109 by a suitable fastening means, such as the use of adhesive and/or fasteners. One or more alignment guides or keyways (not shown) may be used to align sleeve assembly 206 with split pivot fitting 103. In the preferred embodiment, sleeve assembly 206 is configured, dimensioned, and made of a material that allows a selected amount of rotation of cross tube 109 about a generally lateral axis 208 (see FIG. 3).

Figure 6:
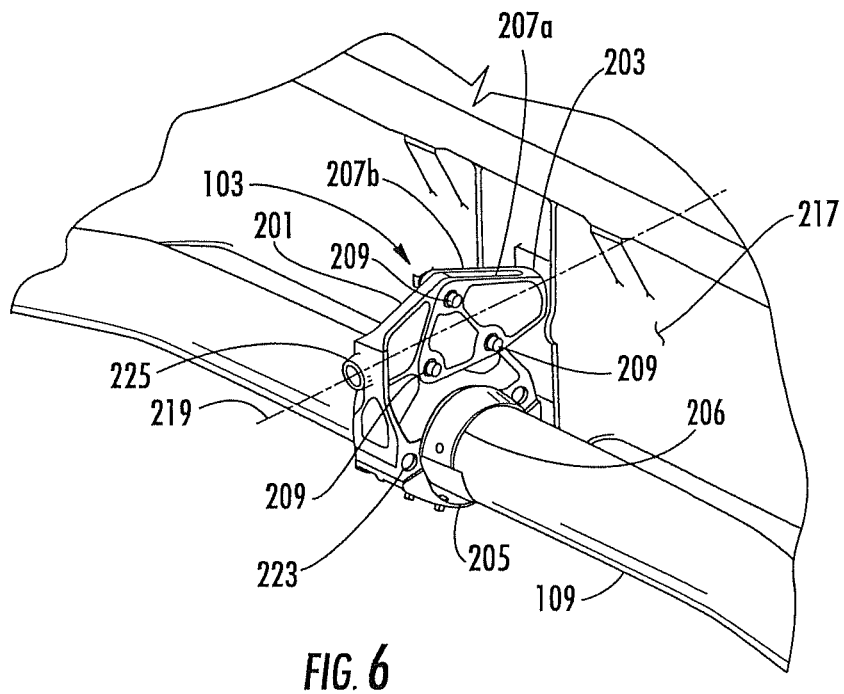
FIG. 6 is a perspective view of the split pivot fitting installed on the rear cross tube of the landing gear of the aircraft of FIG. 1, as seen with the forward cross beam of the aircraft removed.

Split pivot fitting 103 is pivotally coupled to one or more cross beams of floor structure 119, such as a forward cross beam 215 and an aft cross beam 217, so as to allow split pivot fitting 103 to rotate about a generally longitudinal axis 219 (see FIG. 6). To facilitate pivoting about axis 219, forward fitting 201 includes forward pivot pin 225 that is pivotally received by forward cross beam 215, and aft fitting 203 includes aft pivot pin 227 that is pivotally received by aft cross beam 217. One or more bearings or bushings (not shown) are preferably utilized between forward pivot pin 225 and forward cross beam 215, and between aft pivot pin 227 and aft cross beam 217, to prevent wear. Forward cross beam 215 and aft cross beam 217 are preferably adjacent cross beams, but need not be. In the preferred embodiment, forward cross beam 215 and aft cross beam 217 are coupled to one or more generally longitudinal keel beams (not shown), thereby forming a supporting framework for floor structure 119. This configuration allows cross tube loads to be transferred to the keel beams of the aircraft, thereby allowing selected longitudinal rocking of the aircraft and preventing the aircraft from going into a resonance state.

In the preferred embodiment, aft fitting 203 has two clevis arms 207a and 207b that receive forward fitting 201 therebetween. Forward fitting 201 and aft fitting 203 are releasably connected together by a fastening means 209. In the preferred embodiment, the fastening means 209 is three bolts arranged in triangular pattern. It should be understood that the fastening means may be any of a wide variety of releasable, detachable, adjustable, or telescoping fastening means, including clamps, clips, pins, screws, latches, etc. It is only necessary that forward fitting 201 be movable or collapsible toward aft fitting 203, so as to allow the removal of forward pivot pin 225 from forward cross beam 215 and the removal of aft pivot pin 227 from aft cross beam 217. It will be appreciated that in other embodiments, forward fitting 201 may include clevis arms that receive aft fitting 203, or forward fitting 201 and aft fitting 203 may be fitted together with other configurations, such as single overlapping, abutting, or with one or more joining members or adapters.

Referring now also to FIGS. 7A-7F in the drawings, the installation and operation of split pivot fitting 103 will be further described. As seen in the example and application illustrated in the drawings, split pivot fitting 103 is particularly well suited for use on an aircraft in which the aft cross tube 109 is partially recessed within fuselage 102; however, it should be understood that split pivot fitting 103 may be used with aircraft having other cross tube configurations.

Figure 7A:
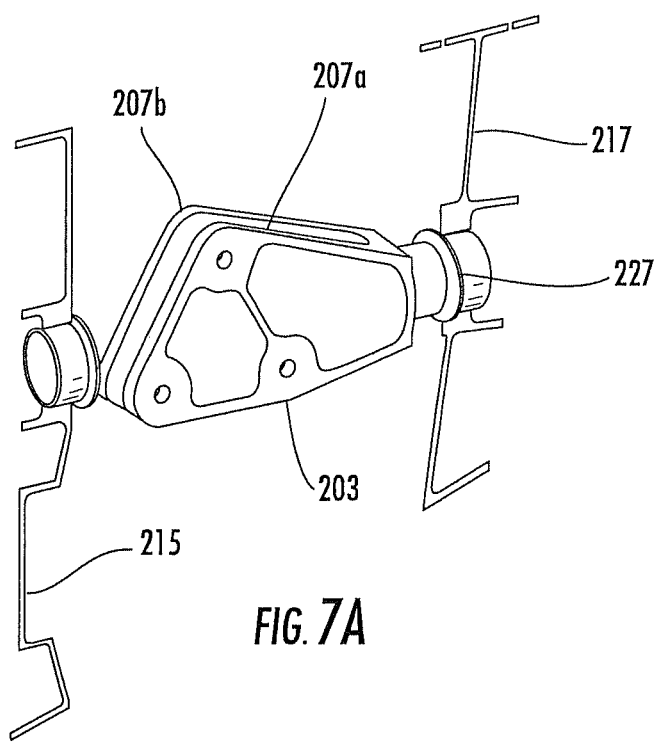
FIGS. 7A-7F are perspective views of the split pivot fitting of the aircraft of FIG. 1, shown partially assembled with the forward and aft crossbeams shown partially transparent to illustrate the steps and procedures for installing and uninstalling the split pivot fitting.
Figure 7B:
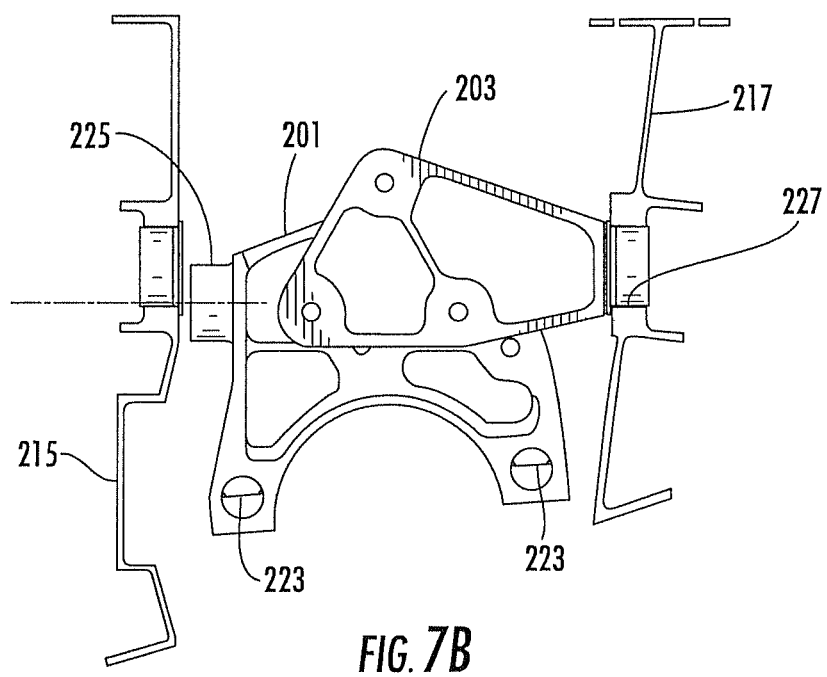
Figure 7C:
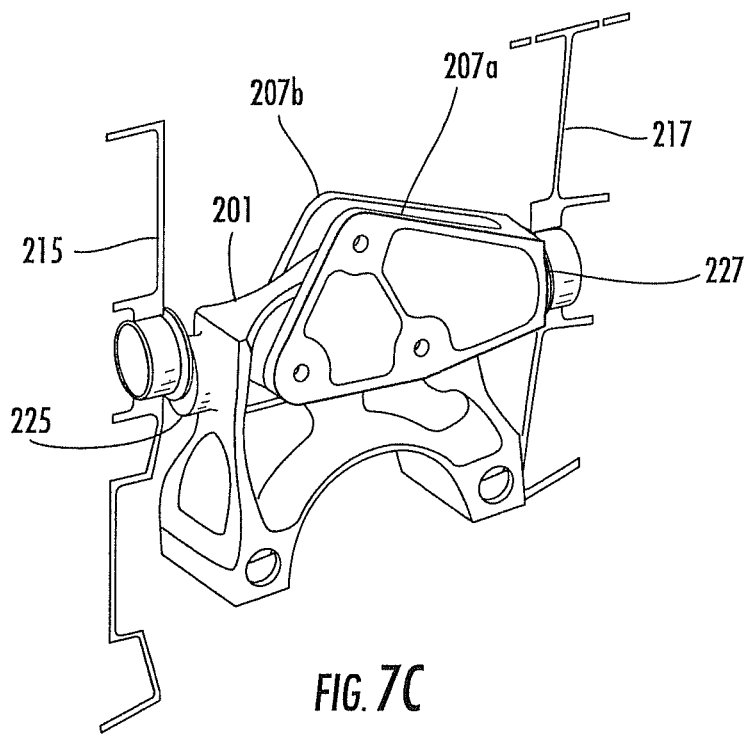

The installation of split pivot fitting 103 begins in FIG. 7A. First, as illustrated in FIG. 7A, aft fitting 203 is inserted between forward cross beam 215 and aft cross beam 217. The space between forward cross beam 215 and aft cross beam 217 is preferably accessible from underneath aircraft 101. This eliminates the need for access panels in the exterior of the fuselage and in the interior floor structure 119, and ensures that split pivot fitting 103 is quickly and easily accessible and removable for installation, removal, inspection, servicing, and maintenance. Aft pivot pin 227 of aft fitting 203 is then inserted into a suitably shaped and dimensioned bore, aperture, or bracket, in aft cross beam 217. One or more bearings and/or bushings (not shown) are preferably utilized between aft pivot pin 227 and aft cross beam 217 to prevent wear. Next, as shown in FIGS. 7B and 7C, forward fitting 201 is inserted between forward cross beam 215 and aft cross beam 217 from underneath aircraft 101. As forward fitting 201 is inserted, the top portion of forward fitting 201 is positioned between clevis arms 207a and 207b of aft fitting 203. This overlapping configuration reduces the length between aft pivot pin 227 and forward pivot pin 225, and allows split pivot fitting 103 to be installed in confined spaces. It is preferred that the tolerance between forward fitting 201 and aft fitting 203 be made very close, so as to reduce wear.

Figure 7D:
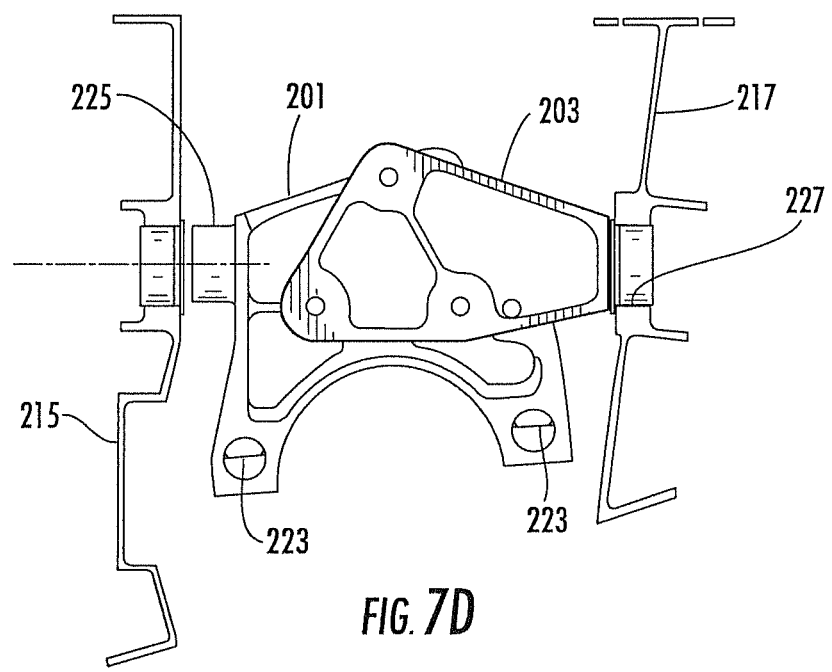
Figure 7E:
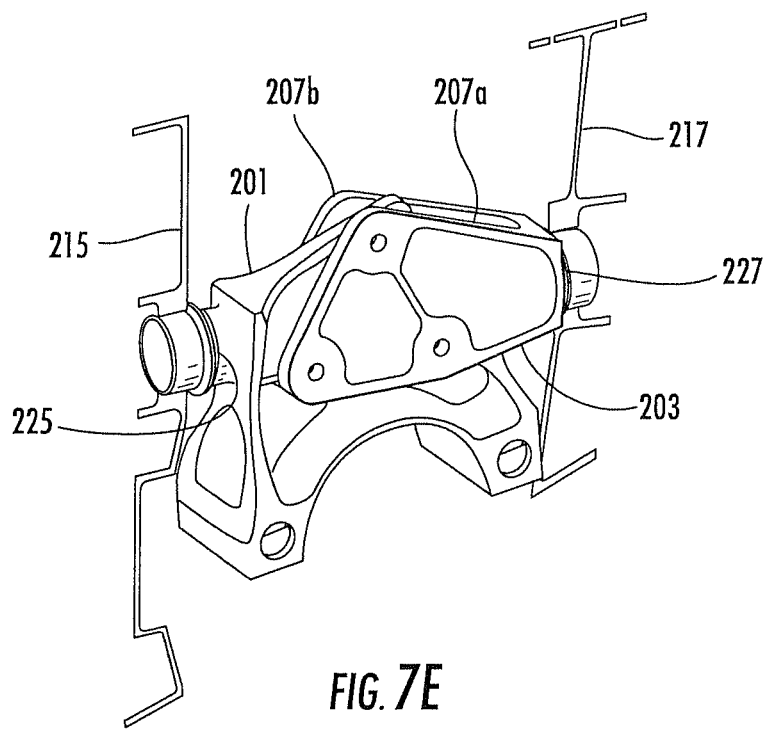
Figure 7F:
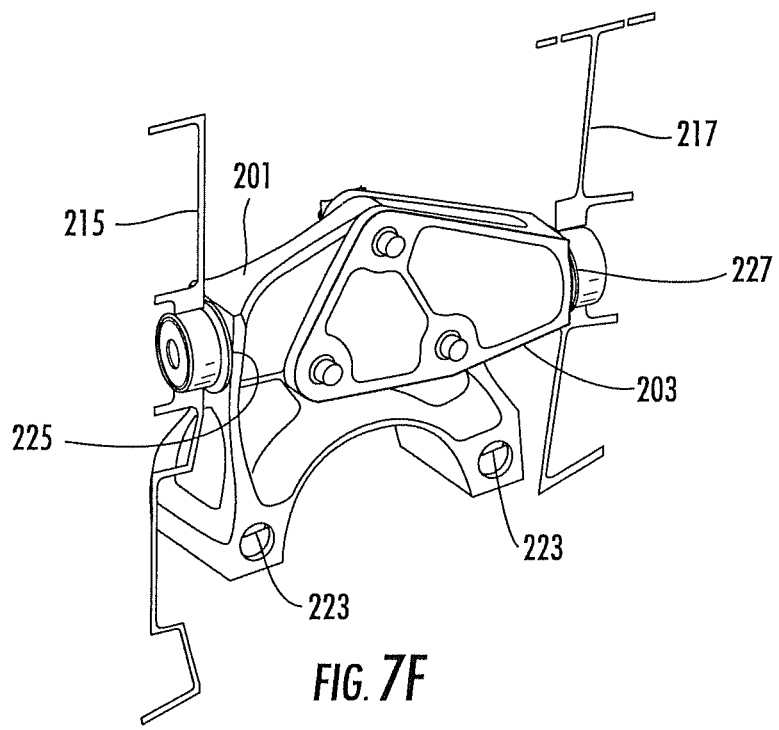

Then, as shown in FIGS. 7D and 7E, forward fitting 201 is positioned such that the mounting apertures on forward fitting 201 and aft fitting 203 are vertically aligned. Next, as shown in FIG. 7F, forward fitting 201 is moved forward relative to aft fitting 203. As forward fitting 201 is moved forward, forward pivot pin 225 of forward fitting 201 is inserted into a suitably shaped and dimensioned bore, aperture, or bracket, in forward cross beam 215. Forward fitting 201 and aft fitting 203 are adjusted such that the corresponding mounting apertures are aligned. One or more bearings and/or bushings (not shown) are preferably utilized between forward pivot pin 225 and aft forward cross beam 215 to prevent wear. Once forward fitting 201 and aft fitting 203 are properly adjusted, fastening means 209 are applied, thereby releasably coupling forward fitting 201 to aft fitting 203 and forming a rigid pivot pin.

Next, sleeve assembly 206 is coupled to cross tube 109 by adhesive and/or fasteners (not shown). Then, cross tube 109 is brought into contact with the lower portion of forward fitting 201. During connection of cross tube 109 to forward fitting 201, alignment guides (not shown) of sleeve assembly 206 may be employed to aid in alignment. Finally, lower strap 205 is releasably coupled to forward fitting by fastening bolts 221 to nut plates 223. Disassembly and removal of split pivot fitting 103 is accomplished by generally performing the foregoing steps in reverse order. Those skilled in the art will appreciate that additional, fewer, or modified steps may be utilized to perform the installation, removal, servicing, replacement, and maintenance of split pivot fitting 103. Thus assembled, split pivot fitting 103 allows rotation of aft cross tube 109 about longitudinal axis 219 and about lateral axis 208 This configuration allows cross tube loads to be transferred to the keel beams of aircraft 101, thereby allowing selected longitudinal rocking of aircraft 101 and preventing aircraft 101 from going into a resonance state.

It is evident by the foregoing description that the invention of the subject application has significant benefits and advantages, in particular: (1) the need for rocker beams is eliminated; (2) the need for access to the pivot assembly from within the interior of the aircraft is eliminated; (3) the split pivot fitting is quickly and easily accessible from beneath the aircraft, thereby facilitating installation, removal, inspection, servicing, and maintenance of the split pivot fitting; (4) more room for fuel or other systems is created, because there is no need for passage of a large one-piece pivot pin through the cross beams; (5) the split pivot fitting saves weight and money due to simplicity; and (6) the split pivot fitting provides a quick, convenient, tunable, and reliable way of transferring cross tube loads to the keel beams of an aircraft, thereby allowing selected longitudinal rocking of the aircraft and preventing the aircraft from going into a resonance state.

The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A split pivot fitting for a helicopter landing gear, comprising:
   a first fitting having a first pivot pin configured to be pivotally received by a first floor structure;
   a second fitting releasably coupled to the first fitting, the second fitting having a second pivot pin configured to be pivotally received by a second floor structure; and
   a lower strap releasably coupled to one of the first fitting and the second fitting, the lower strap configured to matingly receive a lower portion of a cross tube member;
   wherein the first fitting and the second fitting are free to rotate about a longitudinal axis through the first pivot pin and a longitudinal axis through the second pivot pin.

2. The split pivot fitting of claim 1, wherein the second fitting comprises:
   clevis arms that receive the first fitting therebetween.

3. The split pivot fitting of claim 1, wherein the first fitting comprises:
   clevis arms that receive the second fitting therebetween.

4. The split pivot fitting of claim 1, further comprising:
   a sleeve assembly coupled to the cross tube member.

5. The split pivot fitting of claim 4, wherein the sleeve assembly partially surrounds the cross tube member.

6. The split pivot fitting of claim 4, wherein the sleeve assembly is coupled to the cross tube member with at least adhesive.

7. The split pivot fitting of claim 1, wherein the first fitting and the second fitting are receivable into each other, so as to allow at least vertical and longitudinal movement in relation to each other during installation and removal of the second fitting from the second floor structure, and during installation and removal of first fitting from the first floor structure.

8. The helicopter landing gear of claim 1, wherein the first fitting is releasably coupled to the second fitting via a fastening means.

9. A landing gear for a helicopter, comprising:
   a forward cross tube member;
   an aft cross tube member;
   at least two longitudinal skid members coupled to the forward cross tube member and the aft cross tube member; and
   a split pivot fitting releasably coupled to at least one of the aft cross tube member and the forward cross tube member at an approximate lateral midpoint, the split pivot fitting comprising:
      a forward fitting having a forward pivot pin configured to be pivotally received by a first floor structure;
      an aft fitting releasably coupled to the forward fitting, the aft fitting having an aft pivot pin configured to be pivotally received by a second floor structure; and
      a lower strap releasably coupled to one of the forward fitting and the aft fitting, the lower strap configured to matingly receive a lower portion of a cross tube member;
   wherein the forward fitting and the aft fitting are free to rotate about a longitudinal axis through the forward pivot pin and a longitudinal axis through the aft pivot pin.

10. The landing gear of claim 9, wherein the first floor structure is a forward cross beam having a bore for pivotally receiving the forward pivot pin.

11. The landing gear of claim 10, wherein the second floor structure is an aft cross beam having a bore for pivotally receiving the aft pivot pin.

12. The landing gear of claim 11, wherein the first floor structure and the second floor structure are coupled to a keel beam.

13. The landing gear of claim 12, wherein the forward cross beam and the aft cross beam are adjacent to each other.

14. The landing gear of claim 9, wherein the split pivot fitting prevents the helicopter from going into a resonance state.

* * * * *